Oct. 5, 1965
P. R. CARNEY
3,209,999
ANALYZING INSTRUMENTS
Filed June 27, 1963
2 Sheets-Sheet 1
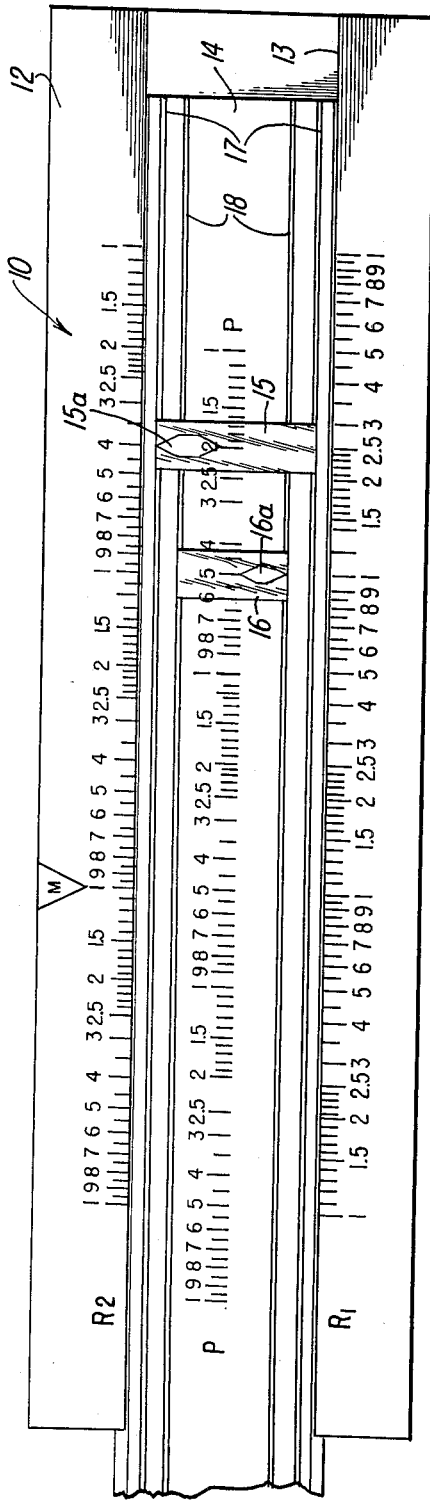
FIG. 1
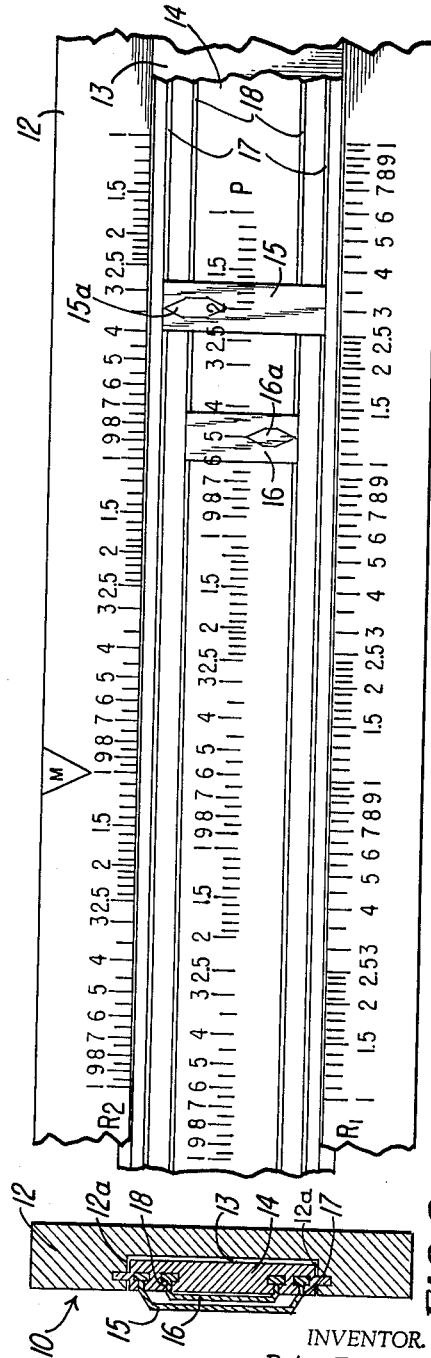
FIG. 3
FIG. 2
INVENTOR.
Peter Roy Carney
BY
Byron, Hume, Groen & Clements
Attys.

Oct. 5, 1965   P. R. CARNEY   3,209,999
ANALYZING INSTRUMENTS
Filed June 27, 1963   2 Sheets-Sheet 2

INVENTOR.
Peter Roy Carney
BY
Byron, Hume, Groen & Clements
Attys.

United States Patent Office 3,209,999
Patented Oct. 5, 1965

3,209,999
ANALYZING INSTRUMENTS
Peter Roy Carney, 135 Oak Terrace, Lake Bluff, Ill.
Filed June 27, 1963, Ser. No. 291,036
3 Claims. (Cl. 235—70)

This invention relates to analyzing systems, and more particularly to analyzing instruments that can be readily employed in a systematic study of securities.

It is an object of the invention to provide improved instruments that facilitate a well-organized comprehensive and current analysis of securities.

It is further object of the invention to provide instruments that readily yield significant information concerning securities and provide the basis for an accurate analysis thereof.

Still another object of the invention is to provide inexpensive and easily operated stock analyzing instruments that may be adapted to a systematic study of securities on a current and comprehensive basis.

Other objects and advantages of the present invention will become apparent from the following detailed description when considered in conjunction with the accompanying drawings wherein:

FIGURE 1 is an enlarged plan view of one embodiment of an improved analyzing instrument embodying the features of the present invention and illustrated in one operative position;

FIGURE 2 is a cross-sectional view of the first embodiment of the analyzing instrument taken along the line 2—2 in FIGURE 1;

FIGURE 3 is a fragmentary plan view of the instrument of FIGURE 1 when in another operative position.

Figure 4:
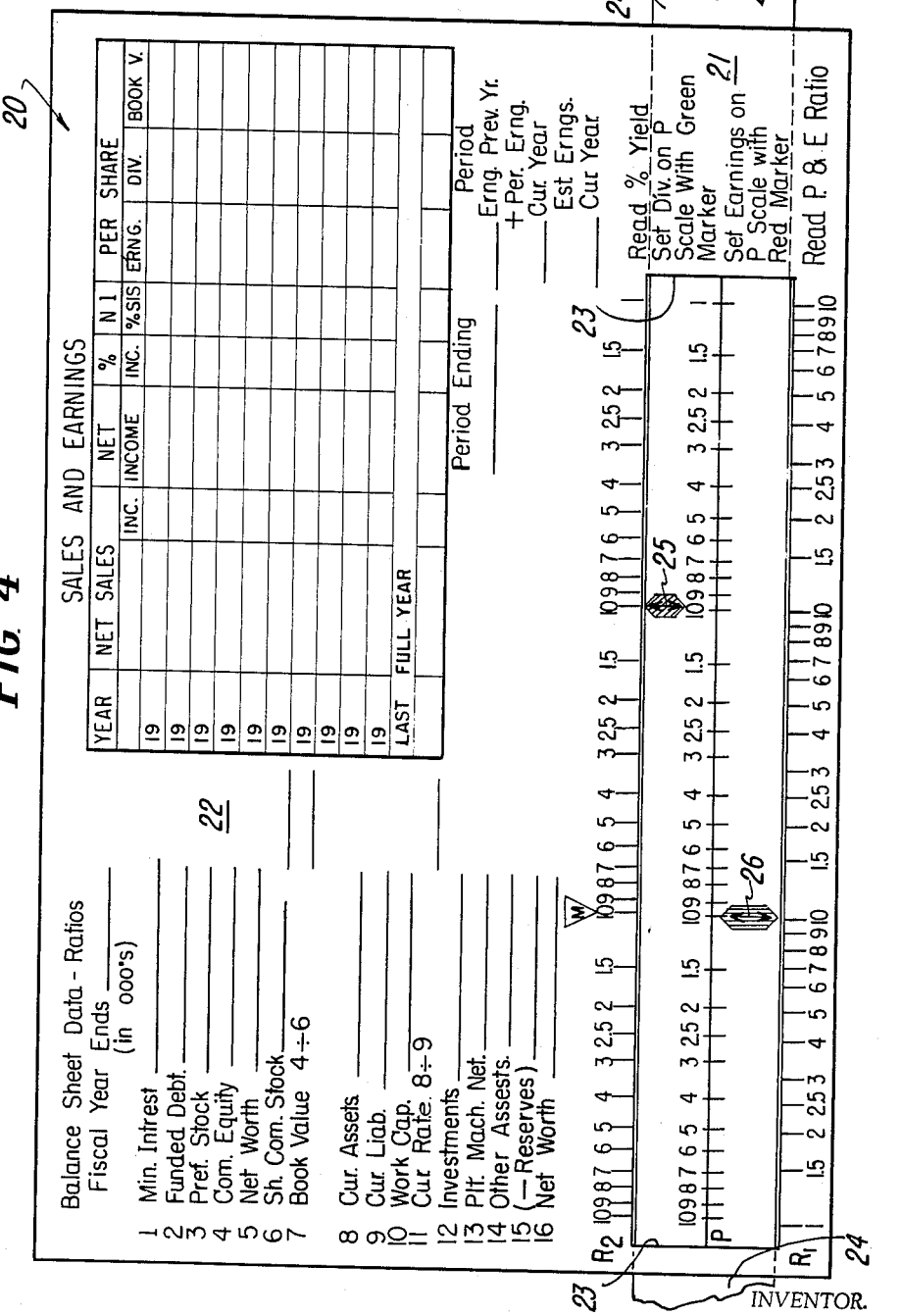
FIGURE 4 is a plan view of another embodiment of an improved analyzing instrument embodying the features of the present invention.

In general, the present invention relates to analyzing instruments that can be employed in an organized, comprehensive and up-to-date analysis of securities by readily providing information such as the price-earnings ratio and yield of a particular stock or group of stocks. These instruments are constructed so that such information as the price-earnings ratio and yield of a particular stock can be readily obtained with a minimum amount of time devoted to the manipulation of the instruments. The instruments are refined and accurate, although not complex. Accordingly, unskilled individuals can rely on the instruments and employ one or more of them to determine relative values of securities on a current basis. If desired, the instruments can be employed in a system to yield a visual comparison of the current price-earnings ratio of a variety of stocks within the same industry. Whether employed in a systematic analysis such as this or utilized for the analysis of a single stock, the instruments yield an instant appraisal of whether dividends exceed earnings. Further, the instruments are such that readily available and currently published statistical information is the basis for the operation thereof.

Referring now to the drawings, two embodiments of analyzing instruments are shown which have particular application to the analysis of various characteristics of one or more securities. In accordance with the invention, the instruments are pre-set with periodically available data, for example, quarterly data relating to earnings and dividends and, thereafter, are adjusted in accordance with the daily price of the security to calculate (a) price-earnings ratio, and (b) yield. Preferably, this periodically available data and the price of the security are designated on suitable scales provided on the instruments as hereinafter fully described, and the calculations are effected in response to manual manipulation of the instruments.

One embodiment is illustrated in FIGS. 1–3 and comprises a slide rule form of instrument that is adapted to analyze and yield information concerning any selected stock. An alternate embodiment is illustrated in FIGURE 4 and comprises a card structure form of the invention that is preferably employed with a number of other similar card structures in a suitable binder or holder. A series of these card structures can be so employed to yield pertinent data relating to the stock of a number of different companies in a related industry.

More specifically, the embodiment illustrated in FIGS. 1–3, and generally designated by the numeral 10 preferably includes a generally elongated body member 12 that may be formed of wood, heavy cardboard, plastic, or the like. One surface of the body member 12 is recessed or cut away to provide a longitudinal guideway 13 that extends along the length of the body member. The guideway 13 is proportioned to receive a slide 14 so that the slide can be selectively moved relative to the body member 12. More particularly, the guideway defining walls 12a of the body member 12 are preferably grooved (FIG. 2) to complement similar grooves formed on the edges of the slide 14. Accordingly, the slide 14 is positively held within the guideway 13, yet is slidable in the guideway 13 in response to manual manipulation.

As shown in FIGS. 1 and 3, the slide 14 is provided with a pair of marker elements 15 and 16. These marker elements are mounted for movement with the slide 14 and relative to the slide and to each other. In this connection, a first pair of spaced apart parallel tracks or grooves 17 is provided on the upper surface of the slide 14. These tracks or grooves 17 extend along the entire length of the slide 14 and are proportioned to receive inwardly extending end portions of the marker element 15, (FIG. 2). The oppositely disposed and inwardly extending end portions of the marker element 15 are preferably confined within the tracks 17 so that movement of the marker element 15 along the surface of the slide is facilitated. As shown, the marker element 15 preferably extends above the surface of the slide 14 a sufficient distance so that this marker element is movable over the marker element 16.

The marker element 16 is also slidably mounted within a pair of parallel, spaced-apart tracks or grooves 18 that are positioned inwardly of the tracks 17. The mounting of the marker element 16 within the spaced-apart tracks 18 is substantially identical to that of the element 15; however, the marker element 16 extends only slightly above the surface of the slide and is maintained below the path of travel of the marker element 15.

The upper surface of the body member 12 adjacent the guideway defining walls 12a is suitably scaled to facilitate the calculation of pertinent stock information. That is, a first or lower scale $R_1$ is provided on the surface of the body member 12 adjacent the lower guideway defining wall 12a. This scale is preferably a logarithmic scale including three repeating subscales each of which, in a conventional manner, increase from left to right. A second or upper scale $R_2$ is provided adjacent the upper guideway defining wall 12a. This upper scale $R_2$ similarly includes three repeating sub-scales; however, to facilitate the calculations effected by the instrument 10, each of these sub-scales increase from right to left as shown in FIGS. 1 and 3. As hereinafter described, the scale $R_1$ is preferably employed in the calculation of the price-earnings ratio of a stock, and the scale $R_2$ is utilized to designate the ratio of paid dividends to price, conventionally known as the "yield" of the stock.

A third logarithmic scale, which is designated by the letter P, is provided on the central portion of the upper surface of the slide 14. This third scale also preferably includes three repeating sub-scales that increase from right to left in a manner similar to the scale $R_2$. In accordance with the present invention, the scale P is selected to be the scale on which the price of the stock, the earnings per share and the dividend per share are designated. The designation of these pertinent values is effected by the placement of the slide 14 relative to a price marker M provided on the body member 12 adjacent the scale $R_2$ and by suitable placement of the marker elements 15 and 16.

The scale P is located on the slide 14 and the scales $R_1$ and $R_2$ on the body member 12 so that the respective left and right indexes of each of the scales are aligned when the slide 14 is located in the normal position shown in FIG. 1. In addition, since the logarithmic scales P and $R_1$ are reversed with respect to the scale $R_2$, the simultaneous subtraction of logarithms and, therefore, the desired simultaneous calculation of the ratio of price to earnings and dividend to price (yield) are readily effected. Furthermore, the location of the scale P, in relation to the scales $R_1$ and $R_2$, is such that marking segments 15a and 16a on the marker elements 15 and 16 are readily accommodated between the scales as shown. Preferably, the marking segments 15a and 16a each have a distinct color (e.g. red and green) so that these segments are distinguishable and so that the relative positions of the marking elements, which otherwise have a transparent character, can be readily determined.

The operation of the instrument 10 will best be understood from a consideration of a set of typical calculations effected by the instrument. Assuming that periodically (e.g. quarterly) available data for a particular stock indicates that the current dividend being paid per share of this stock is $2.00, the dividend marker 15 is positioned on the slide 14 so that the lower end portion of the marking segment 15a is aligned with the numeral "2" on the first of the repeating sub-scales of the P scale. To accomplish this, one mentally designates the repeating sub-scales on the P scale as representing prices of $1.00–$10.00, $10.00–$100.00, and $100.00–$1,000.00, respectively. Assuming further that the current earnings per share of this particular stock is $5.00, the earnings marker 16 is moved along the slide 14 until the upper end portion of the marking segment 16a is aligned with the numeral "5" on the first of the repeating sub-scales of the scale P. Assuming still further that the particular stock to be considered is currently selling at $50.00 a share, the slide member 14 is then moved to the left until the numeral "5" on the second repeating sub-scale of the P scale is positioned under the price marker M, as shown in FIG. 1.

With the instrument so adjusted, the price to earnings ratio is read directly from the $R_1$ scale and the yield of the stock read directly from the $R_2$ scale. Therefore, in the selected example, the price-earnings ratio as read on the $R_1$ scale directly adjacent the lower end portion of the marking segment 16a is 10 to 1 and the yield as designated adjacent to the upper extremity of the marking segment 15a is 4 percent.

If, for example, the price of the stock should thereafter increase to $60.00 per share, the new price-earnings ratio and the new yield of the stock are determined simply by advancing the slide 14 to the right until the numeral "6" on the second of the repeating sub-scales comprising the P scale is positioned under the marker element M as shown in FIG. 3. As a result of this single manipulation of slide 14, the lower end portion of the marker segment 16a becomes aligned with the $R_1$ scale to indicate a price-earnings ratio of 12 to 1, whereas the upper end of the marking segment 15a becomes aligned with the $R_2$ scale so as to indicate a yield of 3.3 percent.

It should be understood that the construction of the instrument 10 as outlined above is subject to variation and modification. For example, the body member 12 may be formed of two relatively thin, elongated bar members that are secured together and maintained in spaced relation by suitable brackets. When so constructed, the aligned inner faces of the bar members are preferably suitably grooved so as to receive a slide member having similar dimensions and grooved upper and lower edges that complement the grooves provided by the bar members. Various other forms and constructions may also be employed and, if desired, a transparent sheet can be secured in overlying relation to the upper surface of the instrument.

An alternate embodiment of a suitable structure adaptable for use in a comprehensive system for analyzing stocks is illustrated in FIG. 4. This embodiment is a composite card 20 including an instrument portion 21 for yielding significant data relating to a particular stock and a suitable data recording portion 22. The card 20 differs from the slide rule form of instrument 10 primarily in that the card is adaptable for mounting in a suitable binder or folder with a number of similar cards. When so employed, each of the several cards is preferably utilized to yield data concerning a particular stock and the cards are physically arranged in the binder in overlying relation so that a comparison of the individual securities can be readily effected. More particularly, the composite card 20 is preferably formed by cardboard on heavy paper having a thickness which precludes the card from being easily torn while at the same time affording a desired degree of flexibility. A pair of spaced apart vertical slots 23, is provided in the instrument portion 21 of the card. The slots 23 are proportioned to receive a slide 24. When properly positioned within the slots 23, the slide passes over the portion of the card lying between the slots, and the end portions of the slide extend slightly beyond the edges of the card.

As shown, logarithmic scales $R_1$ and $R_2$ are provided on the card structure between the slots 23 and adjacent the lower and upper longitudinal edges of the slide 24, respectively. As with the corresponding scales on the aforedescribed instrument 10, the scales $R_1$ and $R_2$ progressively increase in opposite directions and each preferably includes three repeating sub-scales. The slide 24, in a manner similar to the slide 14, is provided with a logarithmic scale P preferably composed of three repeating sub-scales progressing from right to left as shown in FIG. 4.

A pair of double arrow marker elements 25 and 26 is provided on the slide 24. The marker elements are adapted to be moved with the slide 24 and relative to the slide and to each other. In this connection, the double arrow marker elements 25 and 26 are preferably dissimilarly colored segments (e.g. red and green, respectively,) having an adhesive backing that facilitates the positioning of the elements on the slide 24. However, the marker elements may also take the form of transparent bands that are wrapped about the slide. In the latter case, the transparent bands forming the marker elements are provided with dissimilarly colored dual arrow marking segments, and the bands are proportioned to fit snugly about the slide 24.

The operation of the instrument portion 21 of the composite card 20 is substantially the same as that of the instrument 10, and differs only in that the marker elements 25 and 26 are constructed somewhat differently than are the elements 15 and 16. However, once the elements 25 and 26 are properly positioned, the operation on the two instruments is identical. In this connection, after desired calculations are effected by the instrument portion 21 of the card 20, the data derived from these calculations and other information pertaining to the particular stock are transcribed on the recording portion 22 to thereby provide information on which an evaluation of the stock can be predicated.

The positioning of the instrument portion 21 adjacent the lower surface of the card 20 readily adapts the card for use in a system that yields a comprehensive and current analysis of securities. In this connection and as generally outlined above, the composite card 20 can be suitably employed in conjunction with a number of other similar cards and mounted within a binder or multi-card folder in overlying relation with the lower portions of each of the composite cards, whereon the results of the calculations are designated, exposed to view. A number of such card structures, each representing the stock of different companies in a given industry, can be so arranged that the significant data presented on either or both the $R_1$ and $R_2$ scales of each card can be readily compared.

From the foregoing, it will be apparent that the present invention provides improved instruments that are readily adaptable to a system for analyzing securities. The instruments are relatively simple in construction, low in cost and yield the desired information with a minimum amount of manipulation. Moreover, the layout of the various scales on the instruments facilitates the simultaneous determination of various factors relating to a particular stock or a group of stocks. In addition, by employing the distinct similarly colored marker elements, one can determine at a glance whether dividends exceed earnings and are paid out of surplus.

It should be understood that the foregoing is merely illustrative of two preferred embodiments of the invention. Various modifications of the structural and functional features embodied in the instrument 10 and in the composite card structure 20 can be devised by those skilled in the art without departing from the invention, various novel features of which are set forth in the accompanying claims.

What is claimed is:

1. An instrument for calculating significant data relating to securities, which instrument comprises a generally elongated body member having a guideway provided in one surface and extending along the length thereof, a first repeating logarithmic scale provided on said body member adjacent one longitudinal edge portion of said guideway, a second repeating logarithmic scale provided on said body member adjacent the other longitudinal edge portion of said guideway, said second repeating logarithmic scale progressively increasing in a direction opposite to that of said first logarithmic scale, an elongated slide mounted within said guideway so as to be movable therein relative to said body member, a third repeating logarithmic scale provided on said slide so as to progressively increase in a direction corresponding to said second logarithmic scale, and a pair of marker elements mounted on said slide, said marker elements being adapted for movement with said slide and for slidable movement on said slide relative to said third logarithmic scale and to each other whereby data is designated on said first and second logarithmic scales in response to the placement of said marker elements on said third logarithmic scale and the manipulation of said slide relative to said body member.

2. An instrument for calculating significant data relating to stocks, which instrument comprises a generally elongated body member having a guideway provided in one surface and extending along the length thereof, a first logarithmic scale for designating the price-earnings ratio of a stock and provided on said body member adjacent one longitudinal edge portion of said guideway, a second logarithmic scale for designating the yield of a stock and provided on said body member adjacent the other longitudinal edge portion of said guideway, said second logarithmic scale increasing in a direction opposite to that of said first logarithmic scale, an elongated slide mounted within said guideway so as to be movable therein relative to said body member, said slide having a first and a second pair of spaced apart parallel tracks provided therein, a third logarithmic scale provided on said body member between said pairs of dual tracks for designating the price, earnings and dividend of a stock, said third logarithmic scale increasing in a direction corresponding to said second logarithmic scale, and a first and a second marker element mounted within said first and second pairs of parallel tracks, said marker elements being adapted for movement with said slide and for movement within said tracks relative to said slide and to each other whereby the price-earnings ratio and yield of a stock can be calculated by said instrument and designated on said first and second logarithmic scales in response to the suitable placement of said marker elements on said third logarithmic scale and the manipulation of said slide relative to said body member.

3. A composite card structure for calculating and recording significant data relating to stocks, which card structure comprises a portion for recording data derived from the calculations and an instrument portion for effecting the calculations, said instrument portion including a pair of guide surfaces formed on said card structure so as to define a generally elongated guideway adjacent the lower portion of said card structure, a first repeating logarithmic scale for designating the price-earnings ratio of a stock provided on said card structure adjacent one longitudinal edge portion of said guideway, a second repeating logarithmic scale for designating the yield of a stock provided on said card structure adjacent the other longitudinal edge portion of said guideway, said second logarithmic scale progressively increasing in a direction opposite to that of said first logarithmic scale, an elongated slide mounted within said guideway so as to be movable therein relative to card structure, a third repeating logarithmic scale provided on said slide for designating the price, earnings and dividend of a stock, said third logarithmic scale progressively increasing in a direction corresponding to said second logarithmic scale, and a pair of marker elements mounted on said slide and adapted to be moved relative thereto and to each other so as to designate the earnings and dividend of a stock on said third logarithmic scale, said marker elements being movable with said slide so that the price-earnings ratio and yield of a stock are designated on said first and second logarithmic scales in response to the selected manipulation of said slide relative to said card structure.

References Cited by the Examiner

UNITED STATES PATENTS

| | | | |
|---|---|---|---|
| 1,599,582 | 9/26 | Moyer | 235—70 |
| 2,593,628 | 4/52 | Strong. | |

FOREIGN PATENTS

| | | |
|---|---|---|
| 460,655 | 6/28 | Germany. |
| 515,071 | 12/30 | Germany. |

LEO SMILOW, *Primary Examiner.*